US006423793B1

(12) United States Patent
Weng et al.

(10) Patent No.: US 6,423,793 B1
(45) Date of Patent: *Jul. 23, 2002

(54) ELASTOMERIC PROPYLENE POLYMERS

(75) Inventors: Weiqing Weng, Houston; Armen H. Dekmezian; Eric J. Markel, both of Kingwood; David L. Peters, Houston, all of TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 09/631,160

(22) Filed: Aug. 3, 2000

Related U.S. Application Data

(62) Division of application No. 09/020,305, filed on Feb. 6, 1998, now Pat. No. 6,184,327.
(60) Provisional application No. 60/067,781, filed on Dec. 10, 1997.

(51) Int. Cl.$^7$ .............................. C08F 4/42; C08F 4/642; C08F 4/643; C08F 110/06
(52) U.S. Cl. ..................... 526/114; 526/119; 526/160; 526/348; 526/351; 526/943
(58) Field of Search ................................ 526/351, 160, 526/943, 348, 114, 119

(56) References Cited

U.S. PATENT DOCUMENTS

| | | |
|---|---|---|
| 3,350,723 A | 11/1967 | Dyer |
| 3,853,778 A * | 12/1974 | Buckley et al. ............. 252/62.1 |
| 4,335,225 A | 6/1982 | Collette et al. |
| 4,530,914 A | 7/1985 | Ewen et al. |
| 4,542,199 A | 9/1985 | Kaminsky et al. |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,701,432 A | 10/1987 | Welborn, Jr. |
| 4,769,910 A | 9/1988 | Noon |
| 4,808,561 A | 2/1989 | Welborn, Jr. |
| 4,871,705 A | 10/1989 | Hoel |
| 4,874,734 A | 10/1989 | Kioka et al. |
| 4,892,851 A | 1/1990 | Ewen et al. |
| 4,908,463 A | 3/1990 | Bottelberghe |
| 4,921,825 A | 5/1990 | Kioka et al. |
| 4,923,833 A | 5/1990 | Kioka et al. |
| 4,924,018 A | 5/1990 | Bottelberghe |
| 4,933,403 A | 6/1990 | Kaminsky et al. |
| 4,937,299 A | 6/1990 | Ewen et al. |
| 4,952,540 A | 8/1990 | Kioka et al. |
| 4,968,827 A | 11/1990 | Davis |
| 5,017,714 A | 5/1991 | Welborn, Jr. |
| 5,026,798 A | 6/1991 | Canich |
| 5,028,670 A | 7/1991 | Chinh et al. |
| 5,057,475 A | 10/1991 | Canich et al. |
| 5,091,352 A | 2/1992 | Kioka et al. |
| 5,103,031 A | 4/1992 | Smith, Jr. |
| 5,120,867 A | 6/1992 | Welborn, Jr. |
| 5,132,281 A | 7/1992 | Chevallier et al. |
| 5,132,381 A | 7/1992 | Winter et al. |
| 5,155,080 A | 10/1992 | Elder et al. |
| 5,157,137 A | 10/1992 | Sangokoya |
| 5,198,401 A | 3/1993 | Turner et al. |
| 5,204,419 A | 4/1993 | Tsutsui et al. |
| 5,206,199 A | 4/1993 | Kioka et al. |
| 5,235,081 A | 8/1993 | Sangokoya |
| 5,240,894 A | 8/1993 | Burkhardt et al. |
| 5,248,801 A | 9/1993 | Sangokoya |
| 5,278,119 A | 1/1994 | Turner et al. |
| 5,278,264 A | 1/1994 | Spaleck et al. |
| 5,296,434 A | 3/1994 | Karl et al. |
| 5,304,614 A | 4/1994 | Winter et al. |
| 5,308,815 A | 5/1994 | Sangokoya |
| 5,324,800 A | 6/1994 | Welborn, Jr. et al. |
| 5,329,032 A | 7/1994 | Tran et al. |
| 5,352,749 A | 10/1994 | DeChellis et al. |
| 5,391,629 A | 2/1995 | Turner et al. |
| 5,391,790 A | 2/1995 | Rohrmann et al. |
| 5,405,922 A | 4/1995 | DeChellis et al. |
| 5,436,304 A | 7/1995 | Griffin et al. |
| 5,504,169 A | 4/1996 | Canich |
| 5,510,502 A | 4/1996 | Sugano et al. |
| 5,539,056 A * | 7/1996 | Yang et al. .................. 525/240 |
| 5,643,847 A | 7/1997 | Walzer, Jr. |
| 5,955,557 A * | 9/1999 | Machida et al. ............ 526/346 |
| 5,969,070 A * | 10/1999 | Waymouth et al. ......... 526/351 |
| 6,184,327 B1 * | 2/2001 | Weng et al. ................ 526/351 |

FOREIGN PATENT DOCUMENTS

| | | |
|---|---|---|
| EP | 0 277 003 A | 3/1988 |
| EP | 0 277 004 A | 3/1988 |
| EP | 0 279 586 B | 8/1988 |

(List continued on next page.)

OTHER PUBLICATIONS

*Experimental Methods in Catalyst Research*, vol. 1, Academic Press, 1968, pp. 67–96.

(List continued on next page.)

Primary Examiner—David W. Wu
Assistant Examiner—R. Rabago
(74) Attorney, Agent, or Firm—Brent Peebles; David Alexander; Charles E. Runyan, Jr.

(57) ABSTRACT

A thermoplastic elastomer is provided comprising a branched olefin polymer having crystalline sidechains and an amorphous backbone wherein at least 90 mole percent of the sidechains are isotactic or syndiotactic polypropylene and at least 80 mole percent of the backbone is atactic polypropylene. Additionally, a process is provided for producing a thermoplastic elastomer composition comprising:

a) contacting, in solution, at a temperature from about 90° C. to about 120° C., propylene monomers with a catalyst composition comprising a chiral, stereorigid transition metal catalyst compound capable of producing isotactic or syndiotactic polypropylene;

b) copolymerizing the product of a) with propylene and, optionally, one or more copolymerizable monomers, in a polymerization reactor using an achiral transition metal catalyst capable of producing atactic polypropylene; and c) recovering a branched olefin polymer.

18 Claims, No Drawings

FOREIGN PATENT DOCUMENTS

| | | |
|---|---|---|
| EP | 0 279 863 B | 8/1988 |
| EP | 0 354 893 | 2/1990 |
| EP | 0 366 411 | 2/1990 |
| EP | 0 426 637 A | 8/1991 |
| EP | 0 495 375 | 7/1992 |
| EP | 0 500 944 | 9/1992 |
| EP | 0 520 732 | 12/1992 |
| EP | 0 561 476 | 9/1993 |
| EP | 0 570 982 | 11/1993 |
| EP | 0 573 403 | 12/1993 |
| EP | 0 577 581 | 1/1994 |
| EP | 0 578 838 | 1/1994 |
| EP | 0 594 218 | 4/1994 |
| JP | H4-337308 | 1/1992 |
| WO | WO 91/09882 | 11/1991 |
| WO | WO 92/00333 | 9/1992 |
| WO | WO 92/10066 | 11/1992 |
| WO | WO 93/19103 | 9/1993 |
| WO | WO 94/03506 | 2/1994 |
| WO | WO 94/07928 | 4/1994 |
| WO | WO 94/10180 | 5/1994 |
| WO | WO 94/28034 | 8/1994 |
| WO | WO 95/25757 | 9/1995 |
| WO | WO 96/00243 | 1/1996 |
| WO | WO 96/00245 | 1/1996 |
| WO | WO 96/04319 | 2/1996 |
| WO | WO 98/34970 | 8/1998 |

OTHER PUBLICATIONS

"Structures and Properties of Block Polymers and Multiphase Polymer System: An Overview of Present Status and Future Potential" S.L.Aggarwal, Sixth Biennial Manchester Polymer Symposium (UMIST Manchester, Mar., 1976, pp. 938–956.

"The Influence of Aromatic Substituents on the Polymerization Behavior of Bridged Zirconocene Catalysts", W. Spaleck, et al., *Organometallics*, 1994, v.13, pp. 954–963.

"ansa–Zirconocene Polymerization Catalysts with Annelated Ring Ligands–Effects on Catalystic Activity and Polymer Chain Lengths", H. Brinzingerk, et al., *Organometallics*, 1994, v.13, pp. 964–970.

"Properties of Isotactic, Atactic, and Stereoblock Homopolymers, Random and Block Copolymers of α–Olefins", G. Natta, *Journal of Polymer Science*, v. 34, pp. 531–549, (1959).

Bivariate Chain Length and Long Chain Branching Distribution for Copolymerization of Olefins and Polyolefin Chains Containing Terminal Double–Bonds, *Macromol. Theory Simul.*, 5 (1996) pp. 547–572.

Semicrystalline Polyolefins—Narrow MWD and Long Chain Branching: Best of Both Worlds *ANTEC*, pp. 2334–2337, (1996).

Cationic Metallocene Polymerization Catalysts Based on Tetrakis (pentafluorophenyl)borate and Its Derivatives, Probing the Limits of Anion "Noncoordination" via a Synthetic, Solution Dynamic, Structural, and Catalytic Olefin Polymerization Study, Jia, et al., *Organometallics*, 1997, v.16, pp. 842–857.

"Thermoplastic Elastomer Categories: A Comparison of Physical Properties", N.R. Legge, *Elastomerics*, pp. 14–20 (Sep., 1991).

* cited by examiner

ELASTOMERIC PROPYLENE POLYMERS

This application is a divisional of U.S. application Ser. No. 09/020,305 (Filed Feb. 6, 1998), now U.S. Pat. No. 6,184,327, which was based on U.S. provisional application No. 60/067,781, filed Dec. 10, 1997.

FIELD OF THE INVENTION

The present invention relates to elastomeric propylene polymers incorporating macromers and a method for the preparation of branched polymers having atactic polypropylene backbones and isotactic or syndiotactic polypropylene sidechains utilizing transition metal catalyst compounds.

BACKGROUND OF THE INVENTION

Thermoplastic elastomers have commonly been produced by forming triblock and multiblock copolymers. These types of copolymers can be useful as thermoplastic elastomer ("TPE") compositions due to the presence of "soft" (elastomeric) blocks connecting "hard" (crystallizable or glassy) blocks. The hard blocks bind the polymer network together at typical use temperatures. However, when heated above the melt temperature or glass transition temperature of the hard block, the polymer flows readily exhibiting thermoplastic behavior. See, for example, G. Holden and N. R. Legge, Thermoplastic Elastomers: A Comprehensive Review, Oxford University Press (1987).

The best commercially known class of TPE polymers are the styrenic block copolymers (SBC), typically linear triblock polymers such as styrene-isoprene-styrene and styrene-butadiene-styrene, the latter of which when hydrogenated become essentially styrene-(ethylene-butene)-styrene block copolymers. Radial and star branched SBC copolymers are also well-known. These copolymers typically are prepared by sequential anionic polymerization or by chemical coupling of linear diblock copolymers. The glass transition temperature ($T_g$) of the typical SBC TPE is equal to or less than about 80–90° C., thus presenting a limitation on the utility of these copolymers under higher temperature use conditions. See, "Structures and Properties of Block Polymers and Multiphase Polymer Systems: An Overview of Present Status and Future Potential", S. L. Aggarwal, Sixth Biennial Manchester Polymer Symposium (UMIST Manchester, March 1976)

Insertion, or coordination, polymerization of olefins can provide economically more efficient means of providing copolymer products, both because of process efficiencies and feedstock cost differences. Thus useful TPE polymers from olefinically unsaturated monomers, such as ethylene and $C_3$–$C_8$ α-olefins, have been developed and are also well-known. Examples include the physical blends of thermoplastic olefins ("TPO") such as polypropylene with ethylene-propylene copolymers, and similar blends wherein the ethylene-propylene, or ethylene-propylene-diolefin phase is dynamically vulcanized so as to maintain well dispersed, discrete soft phase particles in a polypropylene matrix. See, N. R. Legge, "Thermoplastic elastomer categories: a comparison of physical properties", ELASTOMERICS, pages 14–20 (September 1991), and references cited therein.

The use of metallocene catalysts for olefin polymerization has led to additional contributions to the field. U.S. Pat. No. 5,391,629 describes thermoplastic elastomer compounds comprising tapered and block linear polymers from ethylene and alpha-olefin monomers. Polymers having hard and soft segments are said to be possible with single site metallocene catalysts that are capable of preparing both segments. Examples are provided of linear thermoplastic elastomers having hard blocks of high density polyethylene or isotactic polypropylene and soft blocks of ethylene-propylene rubber. Japanese Early Publication H4-337308(1992) describes what is said to be a polyolefin copolymer product made by polymerizing propylene first so as to form an isotactic polypropylene and then copolymerizing the polypropylene with ethylene and propylene, both polymerizations in the presence of an organoaluminum compound and a silicon-bridged, biscyclopentadienyl zirconium dihalide compound.

In addition, block-type polymers of polypropylene have been produced which exhibit elastic properties. G. Natta, in an article titled "Properties of Isotactic, Atactic, and Stereoblock Homopolymers, Random and Block Copolymers of α-Olefins" (Journal of Polymer Science, Vol. 34, pp. 531–549, 1959) reported that an elastomeric polypropylene can be fractionated out of a polymer mixture. The elastomeric properties were attributed to a stereoblock structure comprising alternating isotactic and atactic stereosequences. Similar compositions were disclosed in U.S. Pat. No. 4,335,225. More recently, International Patent WO 95/25757 (Waymouth et al.) described a method for synthesis of elastomeric stereoblock olefin polymers using catalysts which may change their geometry (between a chiral and an achiral geometry) on a time scale that is slower than the rate of monomer insertion, but faster than the average time of a single chain construction. The resulting polymers may have properties ranging from crystalline thermoplastics to thermoplastic elastomers to amorphous gum elastomers depending on ligand type and structure, as well as polymerization conditions.

SUMMARY OF THE INVENTION

The present invention provides a thermoplastic elastomer comprising a novel structure of polypropylene. The structure combines amorphous, atactic polypropylene backbones with high melting point, low molecular weight, isotactic or syndiotactic polypropylene sidechains. This differs from the triblock or multiblock thermoplastic elastomers in that the "hard" domain is primarily present only in the sidechains. The resulting polymer is unique in that the backbone has increased elasticity over backbones having both hard and soft blocks. Also, the crystalline sidechains result in reduced chain slippage upon loading versus standard atactic polypropylene.

The thermoplastic elastomer of the present invention comprises a branched olefin polymer having crystalline sidechains and an amorphous backbone wherein at least 90 mole percent of the sidechains are isotactic or syndiotactic polypropylene and at least 80 mole percent of the backbone is atactic polypropylene.

Additionally, a process is provided for producing a thermoplastic elastomer composition comprising:

a) contacting, in solution, at a temperature from about 90° C. to about 120° C., propylene monomers with a catalyst composition comprising a chiral, stereorigid transition metal catalyst compound capable of producing isotactic or syndiotactic polypropylene;

b) copolymerizing the product of a) with propylene and, optionally, one or more copolymerizable monomers, in a polymerization reactor using an achiral transition metal catalyst capable of\ producing atactic polypropylene; and c) recovering a branched olefin polymer.

DETAILED DESCRIPTION OF THE INVENTION

Thermoplastic elastomers contain stereoblocks of "hard" and "soft" material. In the present invention, the stereoblocks are achieved through incorporation of high melting point, low molecular weight, isotactic or syndiotactic PP macromer into amorphous, atactic PP backbones. The resulting stereoblock polymers have branch blocks with different stereo configurations in branches and backbones as compared to the polymers with stereosequences in the prior art. The highly crystalline, stereospecific branches form well dispersed domains linked by amorphous backbones. Therefore, these branch block polypropylenes have enhanced elasticity as compared to stereoblock thermoplastic elastomers, yet reduced chain slippage upon loading as compared to atactic polypropylene.

The thermoplastic elastomer compositions of this invention are comprised of branched polymers wherein both the polymer backbone and polymeric sidechains are derived from propylene polymerized under coordination or insertion conditions with activated transition metal organometallic catalyst compounds. The sidechains are isotactic or syndiotactic polypropylene which exhibit crystalline, semi-crystalline or glassy properties suitable for hard phase domains in accordance with the art understood meaning of those terms. These sidechains are attached to a polymeric backbone that is amorphous. The backbone is composed of atactic polypropylene and, optionally, one or more comonomers. Preferably, the backbone is atactic polypropylene. These compositions are useful as, among other things, compatibilizers.

As used herein, "isotactic polypropylene" is defined as polypropylene having at least 70% isotactic pentads according to analysis by $^{13}$C-NMR. "Syndiotactic polypropylene" is defined as polypropylene having at least 70% syndiotactic pentads according to analysis by $^{13}$C-NMR. "Highly isotactic polypropylene" is defined as polypropylene having at least 90% isotactic pentads according to analysis by $^{13}$C-NMR. Preferably, the macromers of the present invention are highly isotactic. "Atactic polypropylene" is defined as polypropylene having about 30% or less of isotactic and syndiotactic pentads combined according to analysis by $^{13}$C-NMR, preferably about 20% or less.

The branched polymers of the present invention have crystalline sidechains wherein at least 90 mole percent of the sidechains are isotactic or syndiotactic polypropylene. Preferably, at least 95 mole percent of the sidechains are isotactic polypropylene. More preferably, at least 98 mole percent of the sidechains are isotactic polypropylene. Most preferably, 100 mole percent of the sidechains are isotactic polypropylene.

The branched polymers of the present invention have an amorphous backbone wherein at least 80 mole percent of the backbone is atactic polypropylene. Preferably, at least 90 mole percent of the backbone is atactic polypropylene. More preferably, at least 95 mole percent of the backbone is atactic polypropylene. Most preferably, 100 mole percent of the backbone is atactic polypropylene. The physical and mechanical properties of the branch block polymers may be controlled by regulating the size, crystallinity and amount of macromer incorporated.

The Macromer Sidechains

The sidechains are polypropylene macromers, which can be prepared under solution polymerization conditions with metallocene catalysts suitable for preparing either of isotactic or syndiotactic polypropylene. A preferred reaction process for propylene macromers having high levels of terminal vinyl unsaturation is described in co-pending U.S. application No. 60/067,783 filed Dec. 10, 1997. Typically used catalysts are stereorigid, chiral or asymmetric, bridged metallocenes. See, for example, U.S. Pat. Nos. 4,892,851, 5,017,714, 5,132,281, 5,296,434, 5,278,264, 5,304,614, 5,510,502, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein.

Preferably, the stereorigid transition metal catalyst compound used to produce the isotactic polypropylene macromers of the present invention is selected from the group consisting of bridged bis(indenyl)zirconocenes or hafnocenes. In a preferred embodiment, the transition metal catalyst compound is a dimethylsilyl-bridged bis(indenyl) zirconocene or hafnocene. More preferably, the transition metal catalyst compound is dimethylsilyl bis(2-methyl-4-phenylindenyl)zirconium or hafnium dichloride or dimethyl. In another preferred embodiment, the transition metal catalyst is a dimethylsilyl-bridged bis(indenyl)hafnocene such as dimethylsilyl bis(indenyl)hafnium dimethyl or dichloride.

Preferably, the catalysts used to produce the syndiotactic polypropylene macromers of the present invention are those disclosed in U.S. Pat. Nos. 4,892,851, 5,155,080, and 5,132, 381, the disclosures of which are hereby incorporated by reference.

The method for preparing propylene-based macromers having a high percentage of vinyl terminal bonds involves:

a) contacting, in solution, propylene, optionally a minor amount of copolymerizable monomer, with a catalyst composition containing the stereorigid, activated transition metal catalyst compound at a temperature from about 90° C. to about 120° C., and b) recovering isotactic or syndiotactic polypropylene chains having number average molecular weights of about 2,000 to about 50,000 Daltons.

Preferably, the solution comprises a hydrocarbon solvent such as toluene. Also, the propylene monomers are preferably contacted at a temperature from 95° C. to 115° C. More preferably, a temperature from 100° C. to 110° C. is used. Most preferably, the propylene monomers are contacted at a temperature from 105° C. to 110° C. The pressures of the reaction generally can vary from atmospheric to 345 MPa, preferably to 182 MPa. The reactions can be run batchwise or continuously. Conditions for suitable slurry-type reactions will also be suitable and are similar to solution conditions, the polymerization typically being run in liquid propylene under pressures suitable to such. All documents are incorporated by reference for purposes of U.S. patent practice.

The polypropylene macromers can have narrow or broad molecular weight distribution (Mw/Mn), for example, from 1.5 to 5, typically 1.7 to 3. Optionally, mixtures of sidechains with different molecular weights may be used.

The number-average molecular weight ($M_n$) of the polypropylene macromers of the present invention typically ranges from greater than or equal to 2,000 Daltons to less than about 50,000 Daltons, preferably less than 40,000 Daltons. Preferably, the $M_n$ of the polypropylene macromers of the present invention is greater than or equal to 5,000 Daltons.

Preferably, the macromers of the present invention are made using solution-phase conditions. Preferred solvents for solution phase reactions are selected on the basis of polymer solubility, volatility and safety/health considerations. Nonpolar alkanes or aromatics are preferred. More preferably, the solvent is aromatic. Most preferably, the solvent is toluene.

The Polyolefin Backbone

The polyolefin backbone of the present invention is composed of propylene monomers and, optionally, one or more comonomers. In one embodiment of the present invention, no comonomers are present in the polyolefin backbone, resulting in a polymer having an atactic polypropylene backbone and isotactic or syndiotactic polypropylene sidechains.

In another embodiment of the present invention, one or more comonomers are present in the backbone. Comonomers which are useful in the present invention include ethylene, $C_4$–$C_{20}$ α-olefins, and lower carbon number ($C_3$–$C_8$)alkyl substituted analogs of the cyclic and styrenic olefins. Other copolymerizable monomers include geminally disubstituted olefins such as isobutylene, $C_5$–$C_{25}$ cyclic olefins such as cyclopentene, norbornene and alkyl-substituted norbornenes, and styrenic monomers such as styrene and alkyl substituted styrenes. Comonomers are selected for use based on the desired properties of the polymer product and the metallocene employed will be selected for its ability to incorporate the desired amount of olefins.

When comonomers are used, they preferably comprise from 3 to 20 mole percent of the branched polyolefin composition. More preferably, the comonomers comprise from 5 to 17 mole percent of the branched polyolefin composition.

The mass of the backbone will typically comprise at least 40 wt % of the total polymer mass, that of the backbone and the sidechains together, so the backbone typically will have a nominal weight-average molecular weight ($M_w$) weight of at least equal to or greater than about 100,000. The term nominal is used to indicate that direct measurement of $M_w$ of the backbone is largely impossible but that characterization of the copolymer product will exhibit measurements of $M_w$ that correlate to a close approximate weight of the polymeric backbone inclusive only of the monoolefin mer derivatives and the insertion moieties of the sidebranches.

Catalysts

Catalysts which are useful for producing the branched polyolefin of the present invention include all catalysts which are capable of producing atactic polypropylene and incorporating significant quantities of the isotactic or syndiotactic polypropylene macromers of the present invention. Preferably, metallocene catalysts are used.

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Preferably, the catalyst used to produce the branched polyolefin of the present invention is a mono-cyclopentadienyl transition metal compound, such as those disclosed in U.S. Pat. Nos. 5,504,169 and 5,539,056, the disclosures of which are herein incorporated by reference. Such preferred compounds include: dimethylsilyl (tetramethylcyclopentadienyl)(cyclododecylamido)titanium dichloride, dimethylsilyl(tetramethylcyclopentadienyl) (cyclohexyl-amido)titanium dichloride, dimethylsilyl (tetramethylcyclopentadienyl)(1-adamantylamido)titanium dichloride, dimethylsilyl(tetramethylcyclopentadienyl)(t-butylamido)titanium dichloride, dimethylsilyl (tetramethylcyclopentadienyl)(s-butylamido)titanium dichloride, dimethylsilyl(tetramethylcyclopentadienyl)(n-butylamido)titanium dichloride, dimethylsilyl (tetramethylcyclopentadienyl)(exo-2-norbornylamido) titanium dichloride, diethylsilyl (tetramethylcyclopentadienyl)(cyclododecyl-amido) titanium dichloride, diethylsilyl (tetramethylcyclopentadienyl)(exo-2-norbornylamido) titanium dichloride, diethylsilyl (tetramethylcyclopentadienyl)(cyclohexyl-amido)titanium dichloride, diethylsilyl(tetramethylcyclopentadienyl)(1-adamantylamido)titanium dichloride, methylene (tetramethylcyclopentadienyl)(cyclododecyl-amido) titanium dichloride, methylene (tetramethylcyclopentadienyl)(exo-2-norbornylamido) titanium dichloride, methylene (tetramethylcyclopentadienyl)(cyclohexylamido)titanium dichloride, methylene(tetramethylcyclopentadienyl)(1-adamantylamido)titanium dichloride, dimethylsilyl (tetramethylcyclopentadienyl)(cyclododecylamido)titanium dimethyl, dimethylsilyl(tetramethylcyclopentadienyl)(exo-2-norbornylamido)titanium dimethyl, dimethylsilyl (tetramethylcyclopentadienyl)(cyclohexyl-amido)titanium dimethyl, dimethylsilyl(tetramethylcyclopentadienyl)(1-adamantylamido)titanium dimethyl, dimethylsilyl(2,5-dimethylcyclopentadienyl)(cyclododecylamido)titanium dichloride, dimethylsilyl(2,5-dimethylcyclopentadienyl) (exo-2-norbornylamido)titanium dichloride, dimethylsilyl (2,5-dimethylcyclopentadienyl)(cyclohexylamido)titanium dichloride, dimethylsilyl(2,5-dimethylcyclopentadienyl)(1-adamantylamido)titanium dichloride, dimethylsilyl(3,4-dimethylcyclopentadienyl)(cyclododecylamido)titanium dichloride, dimethylsilyl(3,4-dimethylcyclopentadienyl) (exo-2-norbornylamido)titanium dichloride, dimethylsilyl (3,4-dimethylcyclopentadienyl)(cyclohexylamido)titanium dichloride, dimethylsilyl(3,4-dimethylcyclopentadienyl)(1-adamantylamido)titanium dichloride, dimethylsilyl(2-ethyl-5-methylcyclopentadienyl)(cyclododecylamido)titanium dichloride, dimethylsilyl(2-ethyl-5-methylcyclopentadienyl)(exo-2-norbornylamido)titanium dichloride, dimethylsilyl(2-ethyl-5-methylcyclopentadienyl)(cyclohexylamido)titanium dichloride, dimethylsilyl(2-ethyl-5-methylcyclopentadienyl)(1-adamantylamido)titanium dichloride, dimethylsilyl(3-ethyl-4-methylcyclopentadienyl)(cyclododecylamido)titanium dichloride, dimethylsilyl(3-ethyl-4-methylcyclopentadienyl)(exo-2-norbornylamido)titanium dichloride, dimethylsilyl(3-ethyl-4-methylcyclopentadienyl)(cyclohexylamido)titanium dichloride, dimethylsilyl(3-ethyl-4-methylcyclopentadienyl)(1-adamantylamido)titanium dichloride, dimethylsilyl(2-ethyl-3-hexyl-5-methyl-4-octylcyclopentadienyl)(cyclododecylamido)titanium dichloride, dimethylsilyl(2-ethyl-3-hexyl-5-methyl-4- octylcyclopentadienyl)(exo-2-norbornylamido)titanium dichloride, dimethylsilyl(2-ethyl-3-hexyl-5-methyl-4-octylcyclopentadienyl)(cyclohexylamido)titanium dichloride, dimethylsilyl(2-ethyl-3-hexyl-5-methyl-4-octylcyclopentadienyl)(1-adamantylamido)titanium dichloride, dimethylsilyl(2-tetrahydroindenyl) (cyclododecylamido)titanium dichloride, dimethylsilyl(2-tetrahydroindenyl)(cyclohexylamido)titanium dichloride, dimethylsilyl(2-tetrahydroindenyl)(1-adamantylamido) titanium dichloride, dimethylsilyl(2-tetrahydroindenyl) (exo-2-norbornylamido)titanium dichloride and the like.

The most preferred species are: dimethylsilyl (tetramethylcyclopentadienyl)(cyclododecylamido)titanium dichloride, dimethylsilyl(tetramethylcyclopentadienyl) (cyclohexyl-amido)titanium dichloride, dimethylsilyl (tetramethylcyclopentadienyl)(1-adamantylamido)titanium dichloride, dimethylsilyl(tetramethylcyclopentadienyl)(exo-2-norbornylamido)titanium dichloride, dimethylsilyl (tetramethylcyclopentadienyl)(cyclododecylamido)titanium dimethyl, dimethylsilyl(tetramethylcyclopentadienyl) (cyclohexyl-amido)titanium dimethyl, dimethylsilyl (tetramethylcyclopentadienyl)(1-adamantylamido)titanium dimethyl, and dimethylsilyl(tetramethylcyclopentadienyl) (exo-2-norbornylamido)titanium dimethyl.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Support Materials

The metallocenes described herein are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be pre-activated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The branched polyolefin of the present invention may be produced using the catalysts described above in any process including gas, slurry or solution phase or high pressure autoclave processes. (As used herein, unless differentiated, "polymerization" includes copolymerization and "monomer" includes comonomer.) Additionally, combinations of the above reactor types in multiple, series reactors and/or multiple reaction conditions and/or multiple catalyst configurations are explicitly intended. Preferably, a gas or slurry phase process is used, most preferably a bulk liquid propylene polymerization process is used.

In the preferred embodiment, this invention is directed toward the bulk liquid polymerization and copolymerization of propylene in a slurry or gas phase polymerization process, particularly a slurry polymerization process. Another embodiment involves copolymerization reactions of propylene with one or more comonomers. Such comonomers include alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1. Other suitable comonomers include geminally disubstituted monomers, $C_5$–$C_{25}$ cyclic olefins such as cyclopentene or norbornene, styrenic olefins such as styrene, and lower carbon number ($C_3$–$C_8$)alkyl substituted analogs of the cyclic and styrenic olefins. In addition, comonomers such as polar vinyl, diolefins such as dienes, for example, 1,3-butadiene, 1,4-hexadiene, norbornadiene or vinylnorbornene, acetylene and aldehyde monomers are suitable.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of from about 1 to about 500 atmospheres or even greater and temperatures in the range of from –60° C. to about 280° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system comonomer and reaction conditions. In general, propylene should be homopolymerized for a time period sufficient to yield a composition having from about 10 to about 90 weight percent homopolymer based on the total weight of the polymer, preferably from about 20 to about 80 weight percent, even more preferably from about 30 to about 70 homopolymer weight percent based on the total weight of the polymer.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

In a preferred embodiment, the polymerization of the present invention is carried out in a series of reactors. In the first reactor, the stereospecific polypropylene macromers of the present invention are formed by reacting propylene monomers, and optionally other comonomers, with at least one first transition metal olefin polymerization catalyst capable of preparing propylene copolymers having greater than 50% chain end-group unsaturation. In the second reactor, the macromers are polymerized with propylene monomers, and optionally other comonomers, in the presence of at least one second transition metal olefin polymerization catalyst capable of incorporating the propylene homopolymer or copolymer sidechains into the branched olefin copolymer to form the branched olefin of the present invention.

Additionally the invention branched polyolefin composition can be prepared directly from the selected olefins concurrently in the presence of a mixed catalyst system comprising at least one first transition metal olefin polymerization catalyst capable of preparing propylene copolymers having greater than 50% chain end-group unsaturation and at least one second transition metal olefin polymerization catalyst capable of incorporating the propylene homopolymer or copolymer sidechains into said branched olefin copolymer. This in situ method can be practiced by any method that permits both preparation of isotactic or syndiotactic polypropylene macromers having crystalline, semicrystalline or glassy properties and copolymerization of the macromers with polypropylene and other comonomers such that a branched copolymer is prepared. Gas phase, slurry and solution processes can be used under conditions of temperature and pressure known to be useful in such processes.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. A preferred product form is to have the comonomer be present in the high molecular weight species of the total polymer composition to provide a favorable balance of good film stretchability without breaking, coupled with low extractables, low haze and good moisture barrier in the film. Accordingly in this preferred case, the same or lower levels of hydrogen are utilized during copolymerization as were used during polymerization in the second or subsequent reactor.

For both polypropylene macromer product and branched polyolefin preparation, it is known that many methods and permutations of the ordering of addition of macromer and monomer species to the reactor are possible, some more advantageous than others. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

It is preferable to use the isotactic or syndiotactic polypropylene macromers such that they are promptly functionalized or copolymerized after being prepared. The highly reactive vinyl groups appear to be susceptible to by-product reactions with adventitious impurities and, even, dimerization or addition reactions with other unsaturated group-containing polymeric chains. Thus maintaining in a cooled, inert environment after preparation and prompt subsequent use will optimize the effectiveness of the use of the polypropylene macromer product. A continuous process utilizing series reactors, or parallel reactors will thus be effective, the polypropylene macromer product being prepared in one and continuously introduced into the other.

INDUSTRIAL UTILITY

The thermoplastic elastomer compositions according to the invention will have use in a variety of applications wherein other thermoplastic elastomer compositions have found use. Such uses include, but are not limited to, those known for the styrene block copolymers, e.g., styrene-isoprene-styrene and styrene-butadiene-styrene copolymers, and their hydrogenated analogs. Such include a variety of uses such as backbone polymers in adhesive compositions and molded articles. The compositions of the invention will also be suitable as compatibilizer compounds for polyolefin blends. Additionally, due to the inherent tensile strength, elasticity, and ease of melt processing, extruded film, coating and packaging compositions can be prepared comprising the invention thermoplastic elastomer compositions, optionally as modified with conventional additives and adjuvents. Further, in view of the preferred process of preparation using insertion polymerization of readily available olefins, the invention thermoplastic elastomer compositions can be prepared with low cost petrochemical feedstock under low energy input conditions (as compared to either of low temperature anionic polymerization or multistep melt processing conditions where vulcanization is needed to achieve discrete thermoplastic elastomer morphologies).

In order that the invention may be more readily understood, reference is made to the following examples, which are intended to illustrate the invention but not to limit the scope thereof.

EXAMPLES

General

All polymerizations were performed in a 2-liter Zipperclave reactor equipped with a water jacket for temperature control. Liquids were measured into the reactor using calibrated sight glasses. High purity (>99.5%) toluene was purified by passing first through basic alumina activated at high temperature in nitrogen, followed by molecular sieve activated at high temperature in nitrogen. Propylene was purified by passing through activated basic alumina and molecular sieves. Methylalumoxane (MAO, 10% in toluene) was received from Albemarle Inc. in stainless steel cylinders, divided into 1-liter glass containers, and stored in a laboratory glove-box at ambient temperature.

Propylene was measured into the reactor through a calibrated container. To ensure the reaction medium was well-mixed, a flat-paddle stirrer rotating at 750 rpm was used.

Reactor Preparation

The reactor was first cleaned by heating to 150° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 3 nitrogen pressurize/vent cycles (to 100 psi). The cycling served two purposes: (1) to thoroughly penetrate all dead ends such as pressure gauges to purge fugitive contaminants and (2) to pressure test the reactor.

Catalysts

All catalyst preparations were performed in an inert atmosphere with <1.5 ppm $H_2O$ content. The catalyst systems used in the synthesis of the isotactic polypropylene macromer was dimethylsilyl bis(2-methyl-4-phenylindenyl) zirconium dichloride. The dimethylsilyl bis(2-methyl-4-phenylindenyl)zirconium dichloride was activated with MAO. To maximize solubility of the metallocene, toluene was used as a solvent. The catalyst as added to a stainless steel tube by pipette and transferred to the reactor.

Dimethylsilyl(tetramethylcyclopentadienyl) (cyclododecylamido)titanium dichloride was used to assemble the branched polyolefin and was made according to the examples in U.S. Pat. No. 5,057,475, the disclosure of which is hereby incorporated by reference.

Example 1

The synthesis of polypropylene macromer was conducted in a 2-liter autoclave reactor. The reactor was charged with toluene (1 L), propylene (150 mL), and triisobutylaluminum (2.0 mL of 1M solution in toluene). The reactor was heated to 105° C. and equilibrated for 5 min. Then 2 mg of dimethylsilyl bis(2-methyl-4-phenylindenyl)zirconium dichloride and 1 mL of MAO (10 wt % in toluene) were injected using a catalyst tube. After 15 min, the reactor was cooled to 25° C. and vented. Methanol (500 mL) was added to the polymer solution to precipitate the polymer. The polymer was collected by filtration, and dried in a vacuum oven for 12 hours. The polymer product had an Mn of 15,700. The ratio of vinyl groups to total olefin groups in the polymer product was 0.85

Example 2

A 2-liter reactor was charged with toluene (1 L) and 15 g of the polypropylene macromer from Example 1. The reactor was heated to 100° C. for 20 min. to dissolve the macromer. The reactor was cooled to 30° C. and 150 mL propylene and 2 mL of MAO (10 wt % in toluene) was added. The reactor was heated to 60° C. and equilibrated for 5 min. Then 5 mg of dimethylsilyl (tetramethylcyclopentadienyl)(cyclododecylamido)titanium dichloride activated in 5 mL of toluene and 2 mL of MAO (10 wt % in toluene) was injected using a catalyst tube. After 60 min, the reactor was cooled to 30° C. and vented. The polymer was precipitated by addition of isopropanol (1 L), and collected by filtration. Final drying was done in a vacuum oven at 70° C. for 12 hours to give a white elastic solid. Yield: 71 g.

Example 3

A 2-liter reactor was charged with toluene (1 L) and 20 g of the polypropylene macromer from Example 1. The reactor was heated to 100° C. for 20 min. to dissolve the macromer. The reactor was cooled to 30° C. and 150 mL propylene and 2 mL of MAO (10 wt % in toluene) was added. The reactor was heated to 60° C. and equilibrated for 5 min. Then 6 mg of dimethylsilyl (tetramethylcyclopentadienyl)(cyclododecylamido)titanium dichloride activated in 5 mL of toluene and 2 mL of MAO (10 wt % in toluene) was injected using a catalyst tube. After 60 min, the reactor was cooled to 30° C. and vented. The polymer was precipitated by addition of isopropanol (1 L), and collected by filtration. Final drying was done in a vacuum oven at 70° C. for 12 hours to give a white elastic solid. Yield: 63 g.

Example 4

A 2-liter reactor was charged with toluene (1 L) and 20 g of the polypropylene macromer from Example 1. The reactor was heated to 100° C. for 20 min. to dissolve the macromer. The reactor was cooled to 30° C. and 150 mL propylene and 2 mL of MAO (10 wt % in toluene) was added. The reactor was heated to 60° C. and equilibrated for 5 min. Then 4 mg of dimethylsilyl (tetramethylcyclopentadienyl)(cyclododecylamido)titanium dichloride activated in 5 mL of toluene and 2 mL of MAO (10 wt % in toluene) was injected using a catalyst tube. After 60 min, the reactor was cooled to 30° C. and vented. The polymer was precipitated by addition of isopropanol (1 L), and collected by filtration. Final drying was done in a vacuum oven at 70° C. for 12 hours to give a white elastic solid. Yield: 53 g.

Example 5

A 2-liter reactor was charged with toluene (1 L) and 20 g of the polypropylene macromer from Example 1. The reactor was heated to 100° C. for 20 min. to dissolve the macromer. The reactor was cooled to 30° C. and 150 mL propylene and 2 mL of MAO (10 wt % in toluene) was added. The reactor was heated to 60° C. and equilibrated for 5 min. Then 3 mg of dimethylsilyl (tetramethylcyclopentadienyl)(cyclododecylamido)titanium dichloride activated in 5 mL of toluene and 1 mL of MAO (10 wt % in toluene) was injected using a catalyst tube. After 30 min, the reactor was cooled to 30° C. and vented. The polymer was precipitated by addition of isopropanol (1 L), and collected by filtration. Final drying was done in a vacuum oven at 70° C. for 12 hours to give a white elastic solid. Yield: 37 g.

Comparative Example 6

A comparative example was conducted to compare a blend of atactic polypropylene and isotactic polypropylene macromer to the branched olefin polymer of the present invention. A blend was produced by combining atactic polypropylene and the isotactic polypropylene macromer produced in Example 1. Atactic polypropylene was produced by charging a 2-liter reactor with toluene (1 L) and adding 150 mL of propylene and 2 mL of MAO (10 wt % in toluene). The reactor was heated to 60° C. and equilibrated for 5 min. Then 4 mg of dimethylsilyl (tetramethylcyclopentadienyl)(cyclododecylamido)titanium dichloride activated in 5 mL of toluene and 2 mL of MAO (10 wt % in toluene) was injected using a catalyst tube. After 60 min, the reactor was cooled to 30° C. and vented. The polymer was precipitated by addition of isopropanol (1 L), and collected by filtration. Final drying was done in a vacuum oven at 70° C. for 12 hours. Yield: 48 g. The atactic polypropylene product had an $M_n$ of 184,500, an $M_w$ of 495,100 and a polydispersity of 2.68.

A flask was charged with toluene (500 mL), atactic polypropylene (12 g), and the polypropylene macromer from Example 1 (3 g). The flask was connected to a condenser and heated to 110° C. under $N_2$ with mechanical stirring. When the polymer was completely dissolved, the flask was cooled to 25° C. and methanol (500 L) was added. The precipitated polymer was collected by filtration, and dried in a vacuum oven at 60° C. for 12 hours to give a white elastic solid. Yield: 14.5 g.

Product Characterization

Some general characterization data for the polymers made in Examples 2 to 5 and Comparative Example 6 are listed in Table 1. The glass transition temperature ($T_g$) and melting point ($T_m$) of the polymer product samples were determined on a DSC 2910 Differential Scanning Calorimeter (TA Instruments). The reported melting points were recorded at second melt with a temperature ramp of 5° C./min. The percentage of polypropylene macromer in the polymer samples was calculated by mass balance.

TABLE 1

| Physical Property Summary | | | | |
|---|---|---|---|---|
| Example | Tm (° C.) | $\Delta H^f$(J/g) | $T_{cryst}$(° C.) | % Macromer |
| 2 | 148.4 | 18.3 | 97.5 | 21 |
| 3 | 148.9 | 27.1 | 94.3 | 31 |
| 4 | 148.3 | 37.9 | 95.1 | 38 |
| 5 | 144.2 | 59.3 | 105.8 | 54 |
| Comp. 6 | 151.0 | 22.9 | 96.1 | 20 |

The polymer product from Examples 2–5 were analyzed by gel permeation chromatography using a Waters 150 C.

high temperature system equipped with a DRI Detector, Showdex AT-806MS column and operating at a system temperature of 145° C. The solvent used was 1,2,4-trichlorobenzene, from which polymer sample solutions of 1.5 mg/ml concentration were prepared for injection. The total solvent flow rate was 1 ml/minute and the injection size was 300 microliters. After elution of the polymer samples, the resulting chromatograms were analyzed using the Waters Expert Fuse program to calculate the molecular weight distribution and one or more of $M_n$, $M_w$ and $M_z$ averages. The results are listed in Table 2.

TABLE 2

GPC Molecular Weight and Number Summary

| Example | Mn | Mw | MWD |
|---|---|---|---|
| 2 | 73,610 | 303,798 | 4.13 |
| 3 | 57,383 | 214,789 | 3.74 |
| 4 | 46,300 | 188,949 | 4.08 |
| 5 | 31,187 | 169,309 | 5.43 |

The tensile stress behavior of the thermoplastic elastomers produced in Examples 2 to 5 and Comparative Example 6 was studied with mechanical testing machines. The polypropylene samples were press-molded into 15 mm long, 6 mm wide and 0.7 mm thick dogbone-shaped specimens at 180° C. The specimens were subjected to strain imposed by an Instron™ 4505 machine at a uniaxial extension rate of 6 in./min. to the breaking point.

The elastic property was characterized with an Instron™ 4505 machine. The specimens were elongated to 300% at an expansion rate of 6 in./min. Stress was released immediately and the recovery was measured after 10 min. The results are presented in Table 3.

TABLE 3

Mechanical Property Summary

| Example | Tensile (psi) | Elongation (%) | Recovery (%) |
|---|---|---|---|
| 2 | 386 | 2310 | 97 |
| 3 | 379 | 1758 | 93 |
| 4 | 511 | 1390 | 90 |
| 5 | 1803 | 60 | Break |
| Comp. 6 | 329 | 2615 | 91 |

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A thermoplastic elastomer composition comprising:
   (a) isotactic or syndiotactic polymer branches derived from macromers that are prepared by a process comprising contacting, in solution, at a temperature from about 90° C. to about 120° C., propylene monomers with a catalyst composition comprising a chiral, stereorigid transition metal catalyst compound capable of producing isotactic or syndiotactic polypropylene; and
   (b) an atactic polymer backbone prepared by a process comprising copolymerizing the macromers with propylene and, optionally, one or more copolymerizable monomers, in a polymerization reactor using an achiral transition metal catalyst capable of producing atactic polypropylene.

2. The composition of claim 1 wherein the catalyst compound of (a) is activated by contacting the catalyst compound with an alumoxane cocatalyst or non-coordinating anion precursor.

3. The composition of claim 2 wherein the processes of (a) and (b) are conducted sequentially in a solution or slurry phase polymerization: process (a) followed by process (b).

4. The composition of claim 1 wherein the processes of (a) and (b) are conducted concurrently.

5. The composition of claim 1 wherein the contacting of (a) is conducted at a temperature from 100° C. to 110° C.

6. The composition of claim 1 wherein the catalyst compound of (a) comprises at least one component, wherein the component is a dimethylsilyl-bridged bis-indenyl zirconocene or hafnocene.

7. The composition of claim 1 wherein the catalyst compound of (a) is at least one dimethylsilyl-bridged bis-indenyl zirconocene.

8. The composition of claim 7 wherein the catalyst compound of (a) further comprises an alumoxane.

9. The composition of claim 1 wherein the catalyst compound of (a) is dimethylsilyl bis(2-methyl-4-phenylindenyl)zirconium dichloride.

10. A process for producing a thermoplastic elastomer composition comprising:
    (a) forming substantially crystalline macromers by contacting, in solution, at a temperature from about 90° C. to about 120° C., propylene monomers with a catalyst composition comprising a chiral, stereorigid transition metal catalyst compound capable of producing isotactic or syndiotactic polypropylene;
    (b) copolymerizing the product of (a) with propylene and, optionally, one or more copolymerizable monomers, in a polymerization reactor using an achiral transition metal catalyst capable of producing polypropylene.

11. The process of claim 10 wherein the catalyst compound of (a) is activated by an alumoxane cocatalyst or non-coordinating anion precursor.

12. The process of claim 11 wherein (a) and (b) are conducted sequentially in a solution or slurry phase polymerization: (a) followed by (b).

13. The process of claim 10 wherein (a) and (b) are conducted concurrently.

14. The process of claim 10 wherein the contacting of (a) is conducted at a temperature from 100° C. to 110° C.

15. The process of claim 10 wherein the catalyst compound of (a) comprises at least one component, wherein the component is a dimethylsilyl-bridged bis-indenyl zirconocene or hafnocene.

16. The process of claim 10 wherein the catalyst compound of (a) is at least one dimethylsilyl-bridged bis-indenyl zirconocene.

17. The process of claim 16 wherein the catalyst compound of (a) further comprises an alumoxane.

18. The process of claim 10 wherein the catalyst compound of (a) is dimethylsilyl bis(2-methyl-4-phenylindenyl) zirconium dichloride.

* * * * *